US009447227B2

(12) United States Patent
Peters

(10) Patent No.: US 9,447,227 B2
(45) Date of Patent: Sep. 20, 2016

(54) FLEXIBLE POLYURETHANE FOAM AND ASSOCIATED METHOD AND ARTICLE

(71) Applicant: SABIC Innovative Plastics IP B.V., Bergen op Zoom (NL)

(72) Inventor: Edward Norman Peters, Lenox, MA (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 78 days.

(21) Appl. No.: 14/044,904

(22) Filed: Oct. 3, 2013

(65) Prior Publication Data
US 2015/0099816 A1    Apr. 9, 2015

(51) Int. Cl.
| C08G 18/76 | (2006.01) |
| C08G 18/48 | (2006.01) |
| C08G 18/66 | (2006.01) |
| C08G 18/18 | (2006.01) |
| C08G 18/08 | (2006.01) |
| C08L 75/04 | (2006.01) |
| C08L 71/12 | (2006.01) |
| C08G 101/00 | (2006.01) |

(52) U.S. Cl.
CPC .......... *C08G 18/76* (2013.01); *C08G 18/1808* (2013.01); *C08G 18/1833* (2013.01); *C08G 18/4816* (2013.01); *C08G 18/4829* (2013.01); *C08G 18/4833* (2013.01); *C08G 18/4841* (2013.01); *C08G 18/6674* (2013.01); *C08G 18/6688* (2013.01); *C08G 18/7671* (2013.01); *C08G 18/0838* (2013.01); *C08G 18/4879* (2013.01); *C08G 2101/005* (2013.01); *C08G 2101/0008* (2013.01); *C08G 2350/00* (2013.01)

(58) Field of Classification Search
CPC .............. C08G 18/0838; C08G 18/76; C08G 18/4879
See application file for complete search history.

(56) References Cited

U.S. PATENT DOCUMENTS

| 2,768,994 A | 10/1956 | MacDonald |
| 2,998,409 A | 8/1961 | Nogare et al. |
| 3,027,352 A | 3/1962 | Walling et al. |
| 3,306,874 A | 2/1967 | Hay |
| 3,383,340 A | 5/1968 | MacCallum et al. |
| 3,383,435 A | 5/1968 | Cizek |
| 3,513,114 A | 5/1970 | Hahn et al. |
| 3,836,829 A | 9/1974 | Eustance |
| 3,847,867 A | 11/1974 | Heath et al. |
| 3,850,885 A | 11/1974 | Takekoshi et al. |
| 3,852,242 A | 12/1974 | White |
| 3,855,178 A | 12/1974 | White et al. |
| 3,873,477 A | 3/1975 | Beck et al. |
| 3,955,987 A | 5/1976 | Schaar et al. |
| 3,972,902 A | 8/1976 | Heath et al. |
| 3,983,093 A | 9/1976 | Williams, III et al. |
| 4,009,137 A | 2/1977 | Dany et al. |
| 4,216,261 A | 8/1980 | Dias |
| 4,336,184 A | 6/1982 | Halpern |
| 4,341,694 A | 7/1982 | Halpern |
| 4,443,591 A | 4/1984 | Schmidt et al. |
| 4,455,410 A | 6/1984 | Giles, Jr. |
| 4,623,558 A | 11/1986 | Lin |
| 4,801,625 A | 1/1989 | Parr et al. |
| 4,923,932 A | 5/1990 | Katayose et al. |
| 5,010,117 A | 4/1991 | Herrington et al. |
| 5,087,657 A | 2/1992 | Qureshi et al. |
| 5,147,710 A | 9/1992 | Bopp et al. |
| 5,169,887 A | 12/1992 | Snow et al. |
| 5,304,593 A | 4/1994 | Nishio et al. |
| 5,326,817 A | 7/1994 | Orikasa et al. |
| 5,534,291 A | 7/1996 | Fukumura et al. |
| 5,723,515 A | 3/1998 | Gottfried |
| 5,811,492 A | 9/1998 | Mori et al. |
| 5,834,565 A | 11/1998 | Tracy et al. |
| 5,852,139 A | 12/1998 | Scheckenbach |
| 6,045,883 A | 4/2000 | Akiyama et al. |
| 6,051,662 A | 4/2000 | Tracy et al. |
| 6,096,817 A | 8/2000 | McNamara |
| 6,096,821 A | 8/2000 | Adedeji et al. |
| 6,121,338 A | 9/2000 | Thompson-Colman et al. |
| 6,632,442 B1 | 10/2003 | Chyall et al. |
| 6,637,810 B2 | 10/2003 | Kisiler et al. |
| 6,706,793 B2 | 3/2004 | Abu-Isa et al. |
| 6,756,430 B2 | 6/2004 | Matsuda et al. |
| 6,905,693 B2 | 6/2005 | Chyall et al. |

(Continued)

FOREIGN PATENT DOCUMENTS

| CA | 2048079 | 1/1993 |
| CN | 102219978 A | 10/2011 |
| CN | 102492231 A | 6/2012 |
| CN | 102702562 A | 10/2012 |
| CN | 102731955 A | 10/2012 |
| CN | 101983987 B | 1/2013 |
| EP | 0119416 A1 | 9/1984 |
| EP | 1253164 A1 | 10/2002 |
| EP | 1303570 B1 | 3/2007 |
| EP | 1896519 B1 | 10/2012 |

(Continued)

OTHER PUBLICATIONS

Johannes Karl Fink; Reactive Polymers Fundamentals and Applications: A Concise Guide to Industrial Polymers; obtained Jun. 2015.*

(Continued)

*Primary Examiner* — Melissa Rioja
(74) *Attorney, Agent, or Firm* — Cantor Colburn LLP

(57) ABSTRACT

A polyurethane foam is prepared from a reaction mixture that includes specific amounts of a polyol, an aromatic isocyanate compound, a particulate poly(phenylene ether), and a blowing agent. The polyurethane foam exhibits one or more of increased compressive force deflection, increased flame retardancy, and increased rate of formation. A method of preparing the foam and articles incorporating the foam are described.

13 Claims, No Drawings

(56) References Cited

U.S. PATENT DOCUMENTS

| | | | |
|---|---|---|---|
| 7,378,455 B2 | 5/2008 | Lu et al. |
| 7,429,800 B2 | 9/2008 | Lu et al. |
| 7,494,178 B2 | 2/2009 | Nygaard |
| 7,737,201 B2 | 6/2010 | Futterer et al. |
| 7,825,176 B2 | 11/2010 | Kim et al. |
| 7,829,614 B2 | 11/2010 | Ding et al. |
| 7,838,580 B2 | 11/2010 | Bauer et al. |
| 7,863,355 B2 | 1/2011 | Futterer et al. |
| 7,923,102 B2 | 4/2011 | Tilbrook et al. |
| 8,017,697 B2 | 9/2011 | Carrillo et al. |
| 8,026,303 B2 | 9/2011 | Levchik et al. |
| 8,206,808 B2 | 6/2012 | Khan et al. |
| 2001/0034418 A1 | 10/2001 | Yeager et al. |
| 2001/0034430 A1 | 10/2001 | Yeager et al. |
| 2002/0028337 A1 | 3/2002 | Yeager et al. |
| 2002/0058780 A1 | 5/2002 | Moses et al. |
| 2003/0125479 A1 | 7/2003 | Kinsho et al. |
| 2003/0139492 A1 | 7/2003 | Abu-Isa |
| 2003/0139501 A1 | 7/2003 | Lewin |
| 2003/0158314 A1 | 8/2003 | Abu-Isa et al. |
| 2003/0209699 A1 | 11/2003 | Chyall et al. |
| 2003/0236361 A1 | 12/2003 | Yeager et al. |
| 2004/0092616 A1 | 5/2004 | Occhiello et al. |
| 2005/0032958 A1 | 2/2005 | Bauer et al. |
| 2005/0049362 A1 | 3/2005 | Buckley et al. |
| 2005/0070685 A1 | 3/2005 | Mitsui et al. |
| 2005/0154130 A1 | 7/2005 | Adedeji et al. |
| 2005/0170238 A1 | 8/2005 | Abu-Isa et al. |
| 2005/0171266 A1 | 8/2005 | Matthijssen et al. |
| 2005/0228087 A1 | 10/2005 | Murakami et al. |
| 2006/0018131 A1 | 1/2006 | Kim et al. |
| 2006/0165524 A1 | 7/2006 | Pellkofer et al. |
| 2007/0027227 A1 | 2/2007 | Shutov |
| 2007/0066739 A1 | 3/2007 | Odle et al. |
| 2007/0093602 A1 | 4/2007 | Thompson-Colon et al. |
| 2007/0093635 A1 | 4/2007 | Ingelbrecht |
| 2007/0173582 A1 | 7/2007 | Rukavina et al. |
| 2008/0003907 A1 | 1/2008 | Black et al. |
| 2008/0114102 A1 | 5/2008 | Balfour et al. |
| 2008/0206449 A1 | 8/2008 | Klei et al. |
| 2008/0206468 A1 | 8/2008 | Klei et al. |
| 2009/0142495 A1 | 6/2009 | Green et al. |
| 2009/0211967 A1 | 8/2009 | Delsman et al. |
| 2009/0275682 A1 | 11/2009 | Furukawa et al. |
| 2010/0004364 A1 | 1/2010 | Lee et al. |
| 2010/0010128 A1 | 1/2010 | Levchik et al. |
| 2010/0139944 A1 | 6/2010 | Guo et al. |
| 2010/0190886 A1 | 7/2010 | Schmitt et al. |
| 2010/0209645 A1 | 8/2010 | Breen et al. |
| 2010/0276055 A1 | 11/2010 | Martin |
| 2010/0304118 A1 | 12/2010 | Baidak et al. |
| 2011/0028631 A1 | 2/2011 | Lawson |
| 2011/0160421 A1 | 6/2011 | Tople et al. |
| 2011/0232242 A1 | 9/2011 | Champion et al. |
| 2011/0259514 A1 | 10/2011 | Boyle et al. |
| 2012/0037396 A1 | 2/2012 | Gu |
| 2012/0164462 A1 | 6/2012 | Schmitt et al. |
| 2012/0305238 A1 | 12/2012 | Duan et al. |
| 2012/0329961 A1 | 12/2012 | Carrillo et al. |
| 2013/0131235 A1 | 5/2013 | Hoerold et al. |
| 2013/0190432 A1 | 7/2013 | Krause et al. |
| 2013/0210975 A1 | 8/2013 | Hoerold et al. |
| 2013/0345345 A1 | 12/2013 | Takamura |
| 2014/0005340 A1 | 1/2014 | Peters et al. |
| 2014/0074813 A1 | 3/2014 | Franks et al. |
| 2014/0100312 A1 | 4/2014 | Peters |
| 2015/0191594 A1 | 7/2015 | Peters et al. |

FOREIGN PATENT DOCUMENTS

| | | |
|---|---|---|
| FR | 2284638 A1 | 4/1976 |
| GB | 1330947 A | 9/1973 |
| JP | S5165159 A | 6/1976 |
| JP | 1222951 A | 9/1989 |
| JP | H3197538 A | 8/1991 |
| JP | 04159366 A | 6/1992 |
| JP | 2519767 B1 | 7/1996 |
| JP | H09104094 A | 4/1997 |
| JP | 2001019839 A | 1/2001 |
| JP | 2002516369 A | 6/2002 |
| JP | 2003128909 A | 5/2003 |
| JP | 2005105009 A | 4/2005 |
| JP | 2006063114 | 3/2006 |
| JP | 2006063114 A | 3/2006 |
| JP | 2008050526 A | 3/2008 |
| KR | 1019950011895 B1 | 10/1995 |
| WO | 9518841 A1 | 7/1995 |
| WO | 0060002 A1 | 10/2000 |
| WO | 02096996 A1 | 12/2002 |
| WO | 03002667 A2 | 1/2003 |
| WO | 2005113661 A1 | 12/2005 |
| WO | 2007050077 A1 | 5/2007 |
| WO | 2012113520 A1 | 8/2012 |
| WO | 2013058690 A1 | 4/2013 |

OTHER PUBLICATIONS

International Search Report for International Application No. PCT/US2014/041515; International Filing Date Jun. 9, 2014; Date of Mailing Oct. 20, 2014; 5 pages.

International Search Report for International Application No. PCT/US2014/043773; Application Filing Date Jun. 24, 2014; Date of Mailing Oct. 20, 2014; 5 pages.

International Search Report for International application No. PCT/US2014/052582; International Filing Date Aug. 25, 2014; Date of mailing Dec. 9, 2014; 5 pages.

International Search Report for International Application No. PCT/US2014/052594; International Filing Date Aug. 26, 2014; Date of Mailing Dec. 2, 2014; 6 pages.

International Search Report for International Application No. PCT/US2014/055737, International filing date Sep. 16, 2014, Date of mailing Dec. 15, 2014, 6 pages.

Sabic Data Sheet for PPO 640 (http://kbam.geampod.com/kbam/reflection/assets/20423.pdf) Last Visited Nov. 14, 2014.

Written Opinion for International Application No. PCT/US2014/041515; International Filing Date Jun. 9, 2014; Date of Mailing Oct. 20, 2014; 7 pages.

Written Opinion for International Application No. PCT/US2014/043773; Application Filing Date Jun. 24, 2014; Date of Mailing Oct. 20, 2014; 8 pages.

Written Opinion for International Application No. PCT/US2014/052582; International filing date Aug. 25, 2014; Date of mailing Dec. 9, 2014; 6 pages.

Written Opinion for International Application No. PCT/US2014/052594; International Filing Date Aug. 26, 2014; Date of Mailing Dec. 2, 2014; 5 pages.

Written Opinion for International Application No. PCT/US2014/055737, International filing date Sep. 16, 2014, Date of mailing Dec. 15, 2014, 3 pages.

U.S. Appl. No. 13/647,829; "Blends of Micronized Polyphenylene Ether and Thermoplastic Polyurethanes Blend"; filed Oct. 9, 2012.

U.S. Appl. No. 13/930,456; "Intumescent Coating Composition Comprising Particulate Poly(Phenylene Ether)"; filed Jun. 28, 2013.

U.S. Appl. No. 13/948,416; "Rigid Foam snd Associated Article and Method"; filed Jul. 23, 2013.

U.S. Appl. No. 14/012,609; "Blend of Poly(Phenylene Ether) Particles and Polyoxymethylene, Article Thereof, and Method of Preparation"; filed Aug. 28, 2013.

U.S. Appl. No. 14/015,044; "Composition and Article Comprising Thermoplastic Polyurethane and Particulate Engineering Polymer"; filed Aug. 30, 2013.

R. Bagheri et al., "Rubber-Toughened Epoxies: A Critical Review," Journal of Macromolecular Science, Part C: Polymer Reviews, vol. 49:3, pp. 201-225, 2009.

C.B. Bucknall et al., "Phase separation in epoxy resins containing polyethersulphone," Polymer, vol. 24, May 1983, pp. 639-644.

CELCON M90, Information Sheet, Ticona Engineering Polymers, Jan. 8, 2007, 6 pages.

(56) References Cited

OTHER PUBLICATIONS

H. Chinn et al., "Polyurethane Elastomers," Chemical Economics Handbook—SRI Consulting, CEH Marketing Research Report, Elastomers—Specialty, Aug. 2006, pp. 1-65.

DELRIN 900P NC010, Product Information, DuPont Delrin, acetal resin, 2010, 4 pages.

Z. Derakhshesh et al., "Design and optimization of an intumescent flame retardant coating using thermal degradation kinetics and Taguchi's experimental design," Polymer International, vol. 61, No. 6, 2012, pp. 926-933.

V. Everaert et al., "Phase morphology development in immiscible PP/(PS/PPE) blends influence of the melt-viscosity ratio and blend composition," Polymer, vol. 40, 1999, pp. 6627-6644.

V. Everaert et al., "Miscible PS/PPE compounds: an alternative for blend phase morphology studies? Influence of the PPE content on the surface tension of PS/PPE and on the interfacial tension in PP/(PS/PPE) and POM/(PS/PPE) blends," Polymer, vol. 41, 2000, pp. 1011-1025.

Everaert et al., "Influence of fractionated crystallization on the semicrystalline structure of (POM/(PS/PPE)) blends, Static and time-resolved SAXS, WAXD and DSC studies," Polymer, vol. 44, 2003, pp. 3491-3508.

Notice of Allowance for U.S. Appl. No. 13/647,829, filed Oct. 9, 2012, Date Mailed Aug. 13, 2013, 7 pages.

H. Harashina et al., "Synergistic effect of red phosphorous, novolac and melamine ternary combination on flame retardancy of poly(oxymethylene)," Polymer Degradation and Stability, vol. 91, 2006, pp. 1996-2002.

C. Hare, "A Review of Polyurethanes: Formulation Variables and Their Effects on Performance," Journal of Protective Coatings and Linings, vol. 17, Issue 11, Nov. 2000, pp. 34-44.

J.C. Hedrick et al., "Toughening of Epoxy Resin Networks with Functionalized Engineering Thermoplastics," In Toughened Plastics 1; Riew, C., et al.; Advances in Chemistry; American Chemical Society, Washington, DC, Chapter 11, May 5, 1993, pp. 293-304.

J.H. Hodgkin et al., "Thermoplastic Toughening of Epoxy Resins: a Critical Review," Polymers for Advanced Technologies, vol. 9, 1998, pp. 3-10.

S. Levchik et al., "Thermal decomposition, combustion and fire-retardancy of polyurethanes—a review of the recent literature," Polymer International, vol. 53, 2004, pp. 1585-1610.

F.J. McGarry et al., "Epoxy-Rubber Interactions," In Toughened Plastics I; Riew, C., et al., Advances in Chemistry, American Chemical Society, Washington, DC, 1993, Chapter 12, pp. 305-315.

Oxley et al.; "Decomposition of Azo & Hydrazo linked Bis Triazines"; 20 pages (2008) http_energetics.chm.uri.edu_q=_system-files-2008 Decomposition of Azo & Hydrazo linked Bis Triazines.pdf.

International Search Report; International Application No. PCT/US2012/069335; International Filing Date Dec. 13, 2012; Date of Mailing Apr. 26, 2013; 4 pages.

Written Opinion of International Searching Authority; International Application No. PCT/US2012/069335; International Filing Date Dec. 13, 2012; Date of Mailing Apr. 26, 2013; 4 pages.

International Search Report; International Application No. PCT/US2012/070829; International Filing Date Dec. 20, 2012; Date of Mailing Jul. 15, 2013; 6 pages.

Written Opinion of International Searching Authority; International Application No. PCT/US2012/070829; International Filing Date Dec. 20, 2012; Date of Mailing Jul. 15, 2013; 4 pages.

R.A. Pearson, "Toughening Epoxies Using Rigid Thermoplastic Particles," In Toughened Plastics I; Riew C., et al.; Advances in Chemistry; American Chemical Society, Washington, DC, Chapter 17, May 5, 1993, pp. 405-425.

R.S. Raghava, "Role of Matrix-Particle Interface Adhesion on Fracture Toughness of Dual Phase Epoxy-Polyethersulfone Blend," Journal of Polymer Science: Part B: Polymer Physics, vol. 25, pp. 1017-1031, 1987.

R.S. Raghava, "Secondary Transitions and Fracture Toughness of Cured Epoxy Resins and Their Blends With Polyethersulfones," 28th National SAMPE Symposium, Apr. 12-14, 1983, pp. 367-373.

D. Ratna et al., "Rubber Toughened Epoxy," Macromolecular Research, vol. 12, No. 1, 2004, pp. 11-21.

Notice of Allowance for U.S. Appl. No. 13/647,829, filed Oct. 9, 2012, Date Mailed Dec. 3, 2013, 7 pages.

J.N. Sultan et al., "Microstructure of Two-Phase Polymers," Applied Polymer Symposium, No. 16, 1971, pp. 127-136.

J.G. Drobny et al., Handbook of Thermoplastic Elastomers, Publishing/Plastics Design Library, 2007, "Thermoplastic Polyurethane Polymers," Chapter 9, pp. 215-234.

S. Ullah et al.; "Effect of Boric Acid with Kaolin Clay on Thermal Degradation of Intumescent Fire Retardant Coating," Journal of Applied Sciences; 2011, pp. 1-5.

D.W. van Krevelen, "Some basic aspects of flame resistance of polymeric materials," Polymer, Aug. 1975, vol. 16, Issue 8, pp. 615-620.

R.W. Venderbosch et al., "Blends of Epoxy Resin and Polyphenylene Ether as a Matrix Material for High-Performance Composites," Conference Papers, 9th International Conference on Deformation, Yield and Fracture of Polymers, Churchill College, Cambridge, UK, Apr. 11-14, 1994, pp. P121/1-P121/4.

R.W. Venderbosch et al., "Processing of intractable polymers using reactive solvents: 1. Poly(2,6-dimethyl-1,4-phenylene ether)/epoxy resin," Polymer, vol. 35, No. 20, 1994, pp. 4349-4357.

G. Wang et al., Thermal degradation study of fire resistive coating containing melamine polyphosphate and dipentaerythritol, Progress in Organic Coatings, vol. 72, 2011, pp. 605-611.

Z. Wang et al., "Flame retardant polyoxymethylene with aluminium hydroxide/melamine/novolac resin synergistic system," Polymer Degradation and Stability, vol. 95, 2010, pp. 945-954.

Z. Wang et al., "Fire-Resistant Effect of Nanoclay on Intumescent Nanocomposite Coatings," Journal of Applied Polymer Science, vol. 103, pp. 1681-1689, 2007.

M. C. Yew et al.; "Effect of Epoxy Binder on Fire Protection and Bonding Strength of Intumescent Fire Protective Coatings for Steel," doi:10.4028/www.scientific.net/AMR.168-170.1228, Advanced Materials Research, 2010, vols. 168-170, pp. 1228-1232.

Q. Zhang et al.; "Synergistic effects of ammonium polyphosphate/melamine intumescent system with macromolecular char former in flame-retarding polyoxymethylene," Journal of Polymer Research, 2011, vol. 18, pp. 293-303.

Non-Final Office Action for U.S. Appl. No. 13/538,295, filed Jun. 29, 2012; Notification date Feb. 4, 2015;25 pages.

Non-Final Office Action for U.S. Appl. No. 13/538,295, filed Jun. 29, 2012; Notification date Aug. 27, 2014; 29 pages.

Non-Final Office Action for U.S. Appl. No. 13/930,456, filed Jun. 28, 2013; Notification date Mar. 24, 2015; 13 pages.

Non-Final Office Action for U.S. Appl. No. 14/012,609, filed Aug. 28, 2013; Notification date Feb. 23, 2015; 11 pages.

Chap. 2, "Literature Review", in "Structure Property Relationships of Flexible Polyurethane Foams", Ashish Aneja, Dissertation, Virginia Polytechnic Institute and State University, Dept. of Chemical Engineering, Oct. 29, 2002.

Chen, et al.: Blends of Thermoplastic Polyurethane and Polyether Polymide: preparation and properties. Polymer, 2001, vol. 42. No. pp. 1493-1500 (Abstract Only).

Javni, et al.: Soybean-Oil-Based Polyisocyanurate Rigid Foams, Journal of Polymers and the Environment, 2004, vol. 12, No. 3, pp. 123-129 (Abstract Only).

Kim, et al.: Effect of Isocyanate Index on the Properties of Rigid Ployurethane Foams Blown by HFC 365mfc, Macromolecular Research, 2008, vol. 16, No. 5, pp. 467-472 (Abstract Only).

Zhou, et al: "Mechanical and Tribological Properties of Polymide-based Composites Modified by Thermoplastic Polyurenthane, Journal of Thermoplastic Composite Materials", 2012, pp. 1-17 (DOI: 10.1177/0892705712439565) (Abstract Only).

Final Office Action for U.S. Appl. No. 13/948,416, filed Jul. 23, 2013; Notification date Oct. 2, 2015; 14 pages.

(56) References Cited

OTHER PUBLICATIONS

Non-Final Office Action for U.S. Appl. No. 14/146,952, filed Jan. 3, 2014; Notification Date Aug. 28, 2015; 17 pages.
Non-Final Office Action for U.S. Appl. No. 13/538,295, filed Jun. 29, 2012; Notification date Sep. 3, 2015; 31 pages.
Final Office Action for U.S. Appl. No. 13/930,456, filed Jun. 28, 2013; Notification Date Sep. 17, 2015; 16 pages.
Yeager, G.; "Polyethers, Aromatic"; Encyclopedia of Polymer Science and Technology; vol. 11; 2004; pp. 64-87.
Non-Final Office Action for U.S. Appl. No. 13/948,416, filed Jul. 23, 2013; Notification Date Jun. 30, 2015; 10 pages.
International Search Report for International Application No. PCT/US2014/069043, International Filing Date Dec. 8, 2014, Date of Mailing Mar. 31, 2015, 3 pages.
Written Opinion for International Application No. PCT/US2014/069043, International Filing Date Dec. 8, 2014, Date of Mailing Mar. 31, 2015, 8 pages.
Non-Final Office Action dated Mar. 23, 2016; U.S. Appl. No. 14/900,428, filed Dec. 21, 2015 (11 pages).
Non-Final Office Action dated Jul. 12, 2016; U.S. Appl. No. 14/015,044, filed Aug. 30, 2013 (88 pages).
Advisory Action for U.S. Appl. No. 13/948,416, filed Jul. 23, 2013; Notification Dated Dec. 10, 2014; 3 pages.

\* cited by examiner

FLEXIBLE POLYURETHANE FOAM AND ASSOCIATED METHOD AND ARTICLE

BACKGROUND OF THE INVENTION

Polyurethanes are prepared from compounds with at least two hydroxyl groups and compounds with at least two isocyanate groups. See, e.g., D. Randall and S. Lee, "The Polyurethanes Book", New York: John Wiley & Sons, 2003; and K. Uhlig, "Discovering Polyurethanes", New York: Hanser Gardner, 1999. The isocyanate groups of the isocyanate compound react with the hydroxyl groups of the hydroxyl compound to form urethane linkages. In many cases, the hydroxyl compound is a low molecular weight polyether or polyester. The isocyanate compound can be aliphatic or aromatic, and in the preparation of linear polyurethanes is typically difunctional (i.e., it is a diisocyanate). However, isocyanate compounds with greater functionality are used in preparing thermoset polyurethanes. The family of polyurethane resins is very complex because of the enormous variation in the compositional features of the hydroxyl compounds and isocyanate compounds. This variety results in a large numbers of polymer structures and performance profiles. Indeed, polyurethanes can be rigid solids, soft and elastomeric, or a have a foam (cellular) structure.

Flexible polyurethane foams are used in applications including bedding, furniture, transportation interiors, carpet underlay, and packaging. However, there remains a desire for flexible polyurethane foams that exhibit one or more of increased compressive force deflection, increased flame retardancy, and increased rate of formation.

BRIEF SUMMARY OF EMBODIMENTS OF THE INVENTION

One embodiment is polyurethane foam comprising the product of a reaction mixture comprising: 40 to 70 weight percent of a polyol; 20 to 40 weight percent of an aromatic isocyanate compound having an average of at least 2 isocyanate groups per molecule; 2 to 30 weight percent of a particulate poly(phenylene ether) having a mean particle size of 1 to 40 micrometers; and 0.5 to 5 weight percent of a blowing agent; wherein the weight percent values are based on the total weight of the polyol, the aromatic isocyanate compound, the particulate poly(phenylene ether), and the blowing agent; wherein the reaction mixture is characterized by an isocyanate index of 65 to 95; and wherein the polyurethane foam has a density of 0.01 to 0.16 grams/centimeter$^3$.

Another embodiment is an article comprising a polyurethane foam, the polyurethane foam comprising the product of a reaction mixture comprising: 40 to 70 weight percent of a polyol; 20 to 40 weight percent of an aromatic isocyanate compound having an average of at least 2 isocyanate groups per molecule; 2 to 30 weight percent of a particulate poly(phenylene ether) having a mean particle size of 1 to 40 micrometers; and 0.5 to 5 weight percent of a blowing agent; wherein the weight percent values are based on the total weight of the polyol, the aromatic isocyanate compound, the particulate poly(phenylene ether), and the blowing agent; wherein the reaction mixture is characterized by an isocyanate index of 65 to 95; and wherein the polyurethane foam has a density of 0.01 to 0.16 grams/centimeter$^3$.

Another embodiment is a method of forming a polyurethane foam, the method comprising: reacting 40 to 70 weight percent of a polyol, and 20 to 40 weight percent of an aromatic isocyanate compound having an average of at least 2 isocyanate groups per molecule, in the presence of 2 to 30 weight percent of a particulate poly(phenylene ether) having a mean particle size of 1 to 40 micrometers, and 0.5 to 5 weight percent of a blowing agent to form a polyurethane foam; wherein the weight percent values are based on the total weight of the polyol, the aromatic isocyanate compound, the particulate poly(phenylene ether), and the blowing agent; wherein the reaction mixture is characterized by an isocyanate index of 65 to 95; and wherein the polyurethane foam has a density of 0.01 to 0.16 grams/centimeter$^3$.

These and other embodiments are described in detail below.

DETAILED DESCRIPTION OF THE INVENTION

The present inventor has determined that a flexible polyurethane foam containing a particulate poly(phenylene ether) exhibits one or more of increased compressive force deflection, increased flame retardancy, and increased rate of formation. Thus, one embodiment is an article comprising a polyurethane foam, the polyurethane foam comprising the product of a reaction mixture comprising: 40 to 70 weight percent of a polyol; 20 to 40 weight percent of an aromatic isocyanate compound having an average of at least 2 isocyanate groups per molecule; 2 to 30 weight percent of a particulate poly(phenylene ether) having a mean particle size of 1 to 40 micrometers; and 0.5 to 5 weight percent of a blowing agent; wherein the weight percent values are based on the total weight of the polyol, the aromatic isocyanate compound, the particulate poly(phenylene ether), and the blowing agent; wherein the reaction mixture is characterized by an isocyanate index of 65 to 95; and wherein the polyurethane foam has a density of 0.01 to 0.16 grams/centimeter$^3$.

The reaction mixture used to form the polyurethane foam includes a polyol. As used herein, the term "polyol" refers to an organic compound with at least two hydroxyl groups. In some embodiments, the polyol comprises an ethylene oxide capped polyether triol, a propylene oxide capped polyether triol, an ethylene oxide capped polyether polyol, or a combination thereof. Additional examples of polyols include diethylene glycol, diethanolamine, dipropylene glycol, ethoxylated glycerins, and combinations thereof.

The reaction mixture comprises the polyol in an amount of 40 to 70 weight percent, based on the total weight of the polyol, the aromatic isocyanate compound, the particulate poly(phenylene ether), and the blowing agent. Within this range, the polyol amount can be 45 to 65 weight percent, specifically 50 to 62 weight percent.

In addition to the polyol, the reaction mixture comprises an aromatic isocyanate compound having an average of at least 2 isocyanate groups per molecule. In some embodiments, the number of isocyanate groups per molecule is 2 to 4, specifically 2 to 3, more specifically 2 to 2.5. Specific examples of aromatic isocyanate compounds include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha', alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

In some embodiments, the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof.

The reaction mixture comprises the aromatic isocyanate compound in an amount of 20 to 40 weight percent, based on the total weight of the polyol, the aromatic isocyanate compound, the particulate poly(phenylene ether), and the blowing agent. Within this range, the aromatic isocyanate compound amount can be 25 to 35 weight percent.

The reaction mixture further comprises a particulate poly(phenylene ether) having a mean particle size of 1 to 40 micrometers. Poly(phenylene ether)s include those comprising repeating structural units having the formula

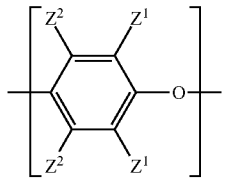

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

The poly(phenylene ether)-polysiloxane block copolymer can be prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

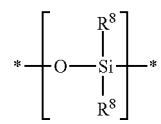

wherein each occurrence of $R^8$ is independently hydrogen, $C_1$-$C_{12}$ hydrocarbyl or $C_1$-$C_{12}$ halohydrocarbyl; and two terminal units having the structure

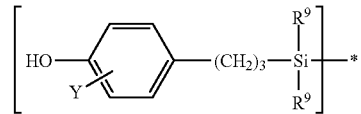

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxyl.

In some embodiments, the monohydric phenol comprises 2,6-dimethylphenol, 2,3,6-trimethylphenol, or a combination thereof, and the hydroxyaryl-terminated polysiloxane has the structure

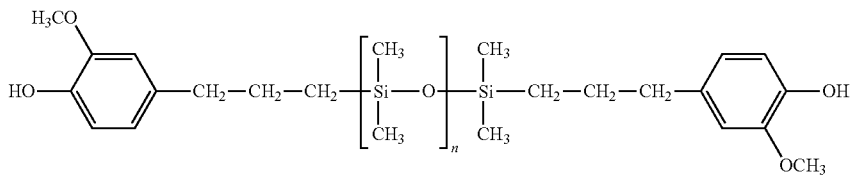

wherein n is, on average, 5 to 100, specifically 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. No. 8,017,697 to Carrillo et al., and U.S. Patent Application Publication No. US 2012/0329961 A1 of Carrillo et al.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.65 deciliter per gram, more specifically 0.35 to 0.5 deciliter per gram, even more specifically 0.4 to 0.5 deciliter per gram.

In some embodiments, the poly(phenylene ether) comprises a homopolymer or copolymer of monomers selected from the group consisting of 2,6-dimethylphenol, 2,3,6-trimethylphenol, and combinations thereof.

In some embodiments, the poly(phenylene ether) comprises a poly(phenylene ether)-polysiloxane block copolymer. In these embodiments, the poly(phenylene ether)-polysiloxane block copolymer can, for example, contribute 0.05 to 2 weight percent, specifically 0.1 to 1 weight percent, more specifically 0.2 to 0.8 weight percent, of siloxane groups to the composition as a whole.

The particulate poly(phenylene ether) has a mean particle size of 1 to 40 micrometers. Within this range, the mean particle size can be 1 to 20 micrometers, specifically 2 to 8 micrometers. In some embodiments, 90 percent of the particle volume distribution of the particulate poly(phenylene ether) is less than or equal to 23 micrometers, specifically less than or equal to 17 micrometers, more specifically 1 to 8 micrometers. In some embodiments, fifty percent of the particle volume distribution of the particulate poly(phenylene ether) is than or equal to 15 micrometers, specifically less than or equal to 10 micrometers, more specifically less than or equal to 6 micrometers. In some embodiments, ten percent of the particle volume distribution of the particulate poly(phenylene ether) is less than or equal to 9 micrometers, specifically less than or equal to 6 micrometers, more specifically less than or equal to 4 micrometers. In some embodiments, less than 10 percent, specifically less than 1 percent, and more specifically less than 0.1 percent, of the particle volume distribution is less than or equal to 38 nanometers. In some embodiments, the particles of the particulate poly(phenylene ether) have a mean aspect ratio of 1:1 to 2:1. Equipment to determine particle size and shape characteristics is commercially available as, for example, the CAMSIZER™ and CAMSIZER™ XT Dynamic Image Analysis Systems from Retsch Technology, and the QICPIC™ Particle Size and Shape Analyzer from Sympatec.

Particulate poly(phenylene ether) can be obtained according to methods readily available to the skilled artisan, for example by jet milling, ball milling, pulverizing, air milling, or grinding commercial grade poly(phenylene ether). "Classification" is defined as the sorting of a distribution of particles to achieve a desired degree of particle size uniformity. A classifier is often used together with milling for the continuous extraction of fine particles from the material being milled. The classifier can be, for example, a screen of certain mesh size on the walls of the grinding chamber. Once the milled particles reach sizes small enough to pass through the screen, they are removed. Larger particles retained by the screen remain in the milling chamber for additional milling and size reduction.

Air classification is another method of removing the finer particles from milling. Air classifiers include static classifiers (cyclones), dynamic classifiers (single-stage, multistage), cross-flow classifiers, and counter-flow classifiers (elutriators). In general, a flow of air is used to convey the particles from the mill to the classifier, where the fine particles are further conveyed to a collector. The coarse particles, being too heavy to be carried by the air stream, are returned to the mill for further milling and size reduction. In larger operations, air classification is more efficient, while in smaller operations a screen can be used.

The polyurethane or polyisocyanurate foam comprises the particulate poly(phenylene ether) in an amount of 2 to 30 weight percent, based on the total weight of the polyol, the aromatic isocyanate compound, the particulate poly(phenylene ether), and the blowing agent. Within this range, the amount of particulate poly(phenylene ether) can be 3 to 25 weight percent, specifically 5 to 20 weight percent.

The reaction mixture further comprises a blowing agent. Blowing agents useful in the method including physical blowing agents, chemical blowing agents, and combinations thereof. Physical blowing agents can be, for example, $C_3$-$C_5$ hydrofluoroalkanes and $C_3$-$C_5$ hydrofluoroalkenes. The hydrofluoroalkane and hydrofluoroalkene blowing agents can also contain one or more hydrogen atoms and/or halogen atoms other than fluorine. In some embodiments, the hydrofluoroalkane and hydrofluoroalkene blowing agents have a boiling point of 10 to 40° C. at 1 atmosphere. Specific physical blowing agents include 1,1-difluoroethane, 1,1,1,2-tetrafluoroethane, pentafluoroethane, 1,1,1,3,3-pentafluoropropane, 1,1,1,3,3-pentafluorobutane, 2-bromopentafluoropropene, 1-bromopentafluoropropene, 3-bromopentafluoropropene, 3,4,4,5,5,5-heptafluoro-1-pentene, 3-bromo-1,1,3,3-tetrafluoropropene, 2-bromo-1,3,3,3-tetrafluoropropene, 1-bromo-2,3,3,3-tetrafluoropropene, 1,1,2,3,3,4,4-heptafluorobut-1-ene, 2-bromo-3,3,3-trifluoropropene, E-1-bromo-3,3,3-trifluoropropene-1, (Z)-1,1,1,4,4,4-hexafluoro-2-butene, 3,3,3-trifluoro-2-(trifluoromethyl) propene, 1-chloro-3,3,3-trifluoropropene, 2-chloro-3,3,3-trifluoropropene, 1,1,1-trifluoro-2-butene, and combinations thereof.

Chemical blowing agents include water and carboxylic acids that react with isocyanate groups to liberate carbon dioxide. In some embodiments, the blowing agent comprises water.

The reaction mixture comprises the blowing agent in an amount of 0.5 to 5 weight percent, based on the total weight of the polyol, the aromatic isocyanate compound, the particulate poly(phenylene ether), and the blowing agent. Within this range, the blowing agent amount can be 0.7 to 3 weight percent, specifically 0.8 to 2.5 weight percent.

The reaction mixture can, optionally, further include additives such as, for example, catalysts, surfactants, flame retardants, smoke suppressants, fillers and/or reinforcements, antioxidants, UV stabilizers, antistatic agents, infrared radiation absorbers, viscosity reducing agents, pigments, dyes, mold release agents, antifungal agents, biocides, and combinations thereof.

The polyurethane-forming reaction can be conducted in the absence of a catalyst for forming urethane linkages. Alternatively, the reaction can be conducted in the presence of a catalyst. Suitable catalysts include tertiary amines and metal compounds based on tin, bismuth, and zinc. Tertiary amine catalysts include triethylenediamine (TEDA), 1,4-diazabicyclo[2.2.2]octane (DABCO), dimethylcyclohexylamine (DMCHA), dimethylethanolamine (DMEA), N-ethylmorpholine, and combinations thereof. Specific metal compounds include bismuth and zinc carboxylates, organotin compounds (including dibutyltin dilaurate and tin carboxylates such as stannous octoate), oxides of tin, bismuth and zinc, and mercaptides of tin, bismuth, and zinc.

The reaction mixture can, optionally, further comprise a solvent. Suitable solvents include aromatic solvents, such as toluene, ethylbenzene, xylenes, anisole, chlorobenzene, dichlorobenzenes, and combinations thereof.

Alternatively, reacting the hydroxy-diterminated poly (phenylene ether) with the organic diisocyanate can be conducted in the absence of a solvent, that is, in bulk.

Surfactants include, for example, polyorganosiloxanes, polyorganosiloxane polyether copolymers, phenol alkoxylates (such as ethoxylated phenol), alkylphenol alkoxylates (such as ethoxylated nonylphenol), and combinations thereof. The surfactants can function as emulsifiers and/or foam stabilizers.

Flame retardants include, for example, organophosphorus compounds such as organic phosphates (including melamine phosphate, ammonium phosphate, trialkyl phosphates such as triethyl phosphate and tris(2-chloropropyl)phosphate, and triaryl phosphates such as triphenyl phosphate and diphenyl cresyl phosphate), phosphites (including trialkyl phosphites, triaryl phosphites, and mixed alkyl-aryl phosphites), phosphonates (including diethyl ethyl phosphonate, dimethyl methyl phosphonate), polyphosphates (including melamine polyphosphate, ammonium polyphosphates), pyrophosphates (including melamine pyrophosphate and ammonium pyrophosphate), polyphosphites, polyphosphonates, phosphinates (including aluminum tris(diethyl phosphinate)); melamine cyanurate; halogenated flame retardants such as tetrabromophthalate esters and chlorinated paraffins; metal hydroxides such as magnesium hydroxide, aluminum hydroxide, cobalt hydroxide, and hydrates of the foregoing metal hydroxides; and combinations thereof. The flame retardant can be a reactive type flame-retardant (including polyols which contain phosphorus groups, 10-(2,5-dihydroxyphenyl)-10H-9-oxa-10-phospha-phenanthrene-10-oxide, phosphorus-containing lactone-modified polyesters, ethylene glycol bis(diphenyl phosphate), neopentylglycol bis(diphenyl phosphate), amine- and hydroxyl-functionalized siloxane oligomers). These flame retardants can be used alone or in conjunction with other flame retardants.

When present, additives are typically used in a total amount of 0.01 to 30 weight percent, based on the total weight of the reaction mixture. Within this range, the total additive amount can be 0.02 to 10 weight percent.

The reaction mixture is characterized by an isocyanate index of 65 to 95. In general, reaction mixtures used to prepare polyurethane (and polyisocyanurate) foams are characterized by an isocyanate index, which is calculated according to the equation $$\text{Isocyanate Index} = \frac{Moles_{NCO}}{Moles_{OH} + Moles_{HOH} + Moles_{NH}} \times 100$$

wherein $Moles_{NCO}$ is the moles of isocyanate groups in the reaction mixture, $Moles_{OH}$ is the moles of OH groups in the reaction mixture from sources other than water (including OH groups from alcohols and carboxylic acids), $Moles_{HOH}$ is the moles of OH groups in the reaction mixture from water, and $Moles_{NH}$ is the moles of NH groups in the reaction mixture. The present the reaction mixture is characterized by an isocyanate index of 65 to 95, specifically 70 to 90.

The polyurethane foam has a density of 0.01 to 0.16 gram/centimeter$^3$ measured at 23° C. according to ASTM D 3574-08, Test A. Within this range, the density can be 0.02 to 0.12 gram/centimeter$^3$, specifically 0.02 to 0.08 gram/centimeter$^3$, more specifically 0.03 to 0.07 gram/centimeter$^3$.

To prepare the polyurethane foam, the polyol component and the isocyanate component, which have been temperature controlled and provided with additives, are thoroughly mixed together. The reaction starts after a short period of time and progresses with heat development. The reaction mixture is continually expanded by the blowing gases released, until the reaction product reaches the solid state as a result of progressive cross-linkage, the foam structure being retained.

The following stages are characteristic of the reaction and foaming process.

The mix time indicates the time needed for mixing the reactants.

The cream time is the time which elapses from the start of mixing of the reactants to the first definite appearance of foam expansion. In many cases this can be seen clearly by a color change as the reaction mixture begins to rise. With slow reacting mixtures this requires practiced observation.

The gel time is the interval of time between mixing the reactants and the formation of a non-flowing, semi-solid, jelly-like system. It is the time when the foam has developed enough gel strength to be dimensionally stable. After the gel time, the speed at which the foam rises slows down.

The rise time is the time from the start of mixing until the end of the optically perceptible rise. Hence it is the time until foam expansion ceases. The surface of the foam is still tacky when the rise process is complete.

The tack-free time is the time elapsing from the start of mixing to the moment when the foam surface has cured sufficiently that its surface is no longer tacky or sticky. The moment of freedom from tack can be determined by repeatedly testing the foam surface with a wooden rod.

In a very specific embodiment of the polyurethane foam, the polyol comprises an ethylene oxide capped polyether triol, a propylene oxide capped polyether triol, an ethylene oxide capped polyether polyol, or a combination thereof; the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; the particulate poly(phenylene ether) is a particulate poly(2,6-dimethyl-1,4-phenylene ether); the particulate poly(phenylene ether) has a mean particle size of 2 to 8 micrometers; the blowing agent comprises water; and the reaction mixture comprises 45 to 65 weight percent of the polyol, 25 to 35 weight percent of the aromatic isocyanate compound, 3 to 25 weight percent of the particulate poly(phenylene ether), and 1.7 to 3 weight percent of the blowing agent.

The invention includes an article comprising the polyurethane foam. Thus, one embodiment is an article comprising a polyurethane foam, the polyurethane foam comprising the product of a reaction mixture comprising: 40 to 70 weight percent of a polyol; 20 to 40 weight percent of an aromatic isocyanate compound having an average of at least 2 isocyanate groups per molecule; 2 to 30 weight percent of a particulate poly(phenylene ether) having a mean particle size of 1 to 40 micrometers; and 0.5 to 5 weight percent of a blowing agent; wherein the weight percent values are based on the total weight of the polyol, the aromatic isocyanate compound, the particulate poly(phenylene ether), and the blowing agent; wherein the reaction mixture is characterized by an isocyanate index of 65 to 95; and wherein the polyurethane foam has a density of 0.01 to 0.16 grams/centimeter$^3$.

Specific articles comprising the polyurethane foam include bedding, furniture, automotive interiors, mass transportation interiors (such as seating, padding, instrument panels, door panels, steering wheels, armrests, and headrests), flooring underlay, packaging, textiles, lining and gasketing applications, acoustic dampening materials, and weather stripping.

In some embodiments, the article is prepared by a slabstock foam process. In this process, the raw materials are mixed, poured onto a moving conveyor, and allowed to react and expand. The resulting foam rises to form a "slab" that is typically from two to four feet high. The continuous slab is then cut into "buns", stored, and allowed to cure for up to 24 hours. The cured foam is subsequently fabricated into useful shapes. The slabstock process can be used for foams employed in furniture, bedding and carpet cushion. The slabstock process is an example of free rise foaming.

In other embodiments, the article is prepared by a molded foam process. In the molded foam process, the raw materials are mixed and poured into specially shaped molds where the foam reaction takes place. Hence, molded foam is a cellular foam product having the shape of the mold cavity in which it was produced. The molded foam process can be used for automotive cushioning, contract furniture cushioning, and cushioning for residential upholstered designs.

In a very specific embodiment of the article, the polyol comprises an ethylene oxide capped polyether triol, a propylene oxide capped polyether triol, an ethylene oxide capped polyether polyol, or a combination thereof; the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; the particulate poly(phenylene ether) is a particulate poly(2,6-dimethyl-1,4-phenylene ether); the particulate poly(phenylene ether) has a mean particle size of 2 to 8 micrometers; the blowing agent comprises water; and the reaction mixture comprises 45 to 65 weight percent of the polyol, 25 to 35 weight percent of the aromatic isocyanate compound, 3 to 25 weight percent of the particulate poly(phenylene ether), and 1.7 to 3 weight percent of the blowing agent.

The invention includes a method of forming the polyurethane foam. Thus, one embodiment is a method of forming a polyurethane foam, the method comprising: reacting 40 to 70 weight percent of a polyol, and 20 to 40 weight percent of an aromatic isocyanate compound having an average of at least 2 isocyanate groups per molecule, in the presence of 2 to 30 weight percent of a particulate poly(phenylene ether) having a mean particle size of 1 to 40 micrometers, and 0.5 to 5 weight percent of a blowing agent to form a polyurethane foam; wherein the weight percent values are based on the total weight of the polyol, the aromatic isocyanate compound, the particulate poly(phenylene ether), and the blowing agent; wherein the reaction mixture is characterized by an isocyanate index of 65 to 95; and wherein the polyurethane foam has a density of 0.01 to 0.16 grams/centimeter$^3$.

In a specific embodiment of the method, the polyol comprises an ethylene oxide capped polyether triol, a propylene oxide capped polyether triol, an ethylene oxide capped polyether polyol, or a combination thereof; the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; the particulate poly(phenylene ether) is a particulate poly(2,6-dimethyl-1,4-phenylene ether); the particulate poly(phenylene ether) has a mean particle size of 2 to 8 micrometers; the blowing agent comprises water; and the polyol amount is 45 to 65 weight percent, the aromatic isocyanate compound amount is 25 to 35 weight percent, the particulate poly(phenylene ether) amount is 3 to 25 weight percent, and the blowing agent amount is 0.7 to 3 weight percent.

All ranges disclosed herein are inclusive of the endpoints, and the endpoints are independently combinable with each other. Each range disclosed herein constitutes a disclosure of any point or sub-range lying within the disclosed range.

The invention includes at least the following embodiments.

Embodiment 1: A polyurethane foam comprising the product of a reaction mixture comprising: 40 to 70 weight percent of a polyol; 20 to 40 weight percent of an aromatic isocyanate compound having an average of at least 2 isocyanate groups per molecule; 2 to 30 weight percent of a particulate poly(phenylene ether) having a mean particle size of 1 to 40 micrometers; and 0.5 to 5 weight percent of a blowing agent; wherein the weight percent values are based on the total weight of the polyol, the aromatic isocyanate compound, the particulate poly(phenylene ether), and the blowing agent; wherein the reaction mixture is characterized by an isocyanate index of 65 to 95; and wherein the polyurethane foam has a density of 0.01 to 0.16 grams/centimeter$^3$.

Embodiment 2: The polyurethane foam of embodiment 1, wherein the polyol comprises an ethylene oxide capped polyether triol, a propylene oxide capped polyether triol, an ethylene oxide capped polyether polyol, or a combination thereof.

Embodiment 3: The polyurethane foam of embodiment 1 or 2, wherein the aromatic isocyanate compound comprises 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

Embodiment 4: The polyurethane foam of any of embodiments 1-3, wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof.

Embodiment 5: The polyurethane foam of any of embodiments 1-4, wherein the particulate poly(phenylene ether) is a particulate poly(2,6-dimethyl-1,4-phenylene ether).

Embodiment 6: The polyurethane foam of any of embodiments 1-5, wherein the particulate poly(phenylene ether) has a mean particle size of 2 to 8 micrometers.

Embodiment 7: The polyurethane foam of any of embodiments 1-6, wherein the blowing agent comprises water.

Embodiment 8: The polyurethane foam of embodiment 1, wherein the polyol comprises an ethylene oxide capped polyether triol, a propylene oxide capped polyether triol, an ethylene oxide capped polyether polyol, or a combination thereof; wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; wherein the particulate poly(phenylene ether) is a particulate poly(2,6-dimethyl-1,4-phenylene ether); wherein the particulate poly(phenylene ether) has a mean particle size of 2 to 8 micrometers; wherein the blowing agent comprises water; and wherein the reaction mixture comprises 45 to 65 weight percent of the polyol, 25 to 35 weight percent of the aromatic isocyanate compound, 3 to 25 weight percent of the particulate poly(phenylene ether), and 1.7 to 3 weight percent of the blowing agent.

Embodiment 9: An article comprising a polyurethane foam, the polyurethane foam comprising the product of a reaction mixture comprising: 40 to 70 weight percent of a polyol; 20 to 40 weight percent of an aromatic isocyanate compound having an average of at least 2 isocyanate groups per molecule; 2 to 30 weight percent of a particulate poly(phenylene ether) having a mean particle size of 1 to 40 micrometers; and 0.5 to 5 weight percent of a blowing agent; wherein the weight percent values are based on the total weight of the polyol, the aromatic isocyanate compound, the particulate poly(phenylene ether), and the blowing agent; wherein the reaction mixture is characterized by an isocyanate index of 65 to 95; and wherein the polyurethane foam has a density of 0.01 to 0.16 grams/centimeter$^3$.

Embodiment 10: The article of embodiment 9, selected from the group consisting of bedding, furniture, automotive interiors, mass transportation interiors, flooring underlay, packaging, textiles, lining and gasketing applications, acoustic dampening materials, and weather stripping.

Embodiment 11: The article of embodiment 9 or 10, wherein the polyol comprises an ethylene oxide capped polyether triol, a propylene oxide capped polyether triol, an ethylene oxide capped polyether polyol, or a combination thereof; wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; wherein the particulate poly(phenylene ether) is a particulate poly(2,6-dimethyl-1,4-phenylene ether); wherein the particulate poly(phenylene ether) has a mean particle size of 2 to 8 micrometers; wherein the blowing agent comprises water; and wherein the reaction mixture comprises 45 to 65 weight percent of the polyol, 25 to 35 weight percent of the aromatic isocyanate compound, 3 to 25 weight percent of the particulate poly(phenylene ether), and 1.7 to 3 weight percent of the blowing agent.

Embodiment 12: A method of forming a polyurethane foam, the method comprising: reacting 40 to 70 weight percent of a polyol, and 20 to 40 weight percent of an aromatic isocyanate compound having an average of at least 2 isocyanate groups per molecule, in the presence of 2 to 30 weight percent of a particulate poly(phenylene ether) having a mean particle size of 1 to 40 micrometers, and 0.5 to 5 weight percent of a blowing agent to form a polyurethane foam; wherein the weight percent values are based on the total weight of the polyol, the aromatic isocyanate compound, the particulate poly(phenylene ether), and the blowing agent; wherein the reaction mixture is characterized by an isocyanate index of 65 to 95; and wherein the polyurethane foam has a density of 0.01 to 0.16 grams/centimeter$^3$.

Embodiment 13: The method of embodiment 12, wherein the polyol comprises an ethylene oxide capped polyether triol, a propylene oxide capped polyether triol, an ethylene oxide capped polyether polyol, or a combination thereof; wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof; wherein the particulate poly(phenylene ether) is a particulate poly(2,6-dimethyl-1,4-phenylene ether); wherein the particulate poly(phenylene ether) has a mean particle size of 2 to 8 micrometers; wherein the blowing agent comprises water; and wherein the polyol amount is 45 to 65 weight percent, the aromatic isocyanate compound amount is 25 to 35 weight percent, the particulate poly(phenylene ether) amount is 3 to 25 weight percent, and the blowing agent amount is 1.7 to 3 weight percent.

The invention is further illustrated by the following non-limiting examples.

EXAMPLES 1-8, COMPARATIVE EXAMPLES 1 AND 2

Raw materials used in these examples are summarized in Table 1. All materials were used as received from suppliers.

TABLE 1

| Material | Description |
| --- | --- |
| POLY-G ™ 85-29 | Ethylene oxide capped polyether triol; hydroxyl value = 26.2 mg eKOH/g; equivalent weight = 2141.22; available as POLY-G ™ 85-29 from Arch Chemicals |
| POLY-G ™ 30-240 | Oxypropylated glycerol; hydroxyl value = 230 mg KOH/g; equivalent weight = 243.91; available as POLY-G ™ 30-240 from Arch Chemicals |
| POLY-G ™ 76-120 | Ethylene oxide capped polyether triol; hydroxyl value = 122.3 mg KOH/g; equivalent weight = 462.49; available as POLY-G ™ 76-120 from Arch Chemicals |
| POLY-G ™ 85-34 | Ethylene oxide capped polyether triol; hydroxyl value = 35.4 mg KOH/g; equivalent weight = 1584.75; available as POLY-G ™ 85-34 from Arch Chemicals |
| LUMULSE ™ POE 26 | Ethoxylated glycerin; hydroxyl value = 134.8 mg KOH/g; equivalent weight = 416.2; available as LUMULSE ™ POE 26 from Lambent Technologies |
| TEGOSTAB ™ B 4690 | Polyether/Silicone Oil Mix; equivalent weight = 1335.7 grams per equivalent of hydroxyl groups; available from Evonik Industries |
| TEGOSTAB ™ B 8871 | Polyether/Silicone Oil Mix; equivalent weight = 561 grams per equivalent of hydroxyl groups; available from Evonik Industries |
| Particulate PPE | Poly(2,6-dimethyl-1,4-phenylene ether) particles having a mean particle size of 6.1 micrometers, 10 volume percent of particles less than 4.0 micrometers, 10 volume percent of particles greater than 8.1 micrometers, and a mean aspect ratio of 1.41:1 |
| Diethylene Glycol | Diethylene Glycol; equivalent weight = 53.1; available from Sigma-Aldrich Corporation |
| Diethanolamine | Diethanolamine; equivalent weight = 35.04; available from Sigma-Aldrich Corporation |
| DABCO ™ 33LV | 33% Triethylenediamine in dipropylene glycol; hydroxyl value = 560 mgKOH/g; available from Air Products |
| DABCO ™ BL-11 | 70% bis(2-Dimethylaminoethyl) ether diluted with 30% dipropylene glycol; hydroxyl value = 251 mg KOH/g; equivalent weight = 223.5; available from Air Products |
| MONDUR ™ MRS-2 | Diphenylmethane diisocyanate, enriched in 2,4'-diphenylmethane diisocyanate; average functionality = 2.2 isocyanate groups per molecule; equivalent weight = 128.8 grams per equivalent; 32.6 weight percent isocyanate; available from Bayer MaterialScience |

For the purpose of calculating polyol content, the contributions of POLY-G™ 85-29, POLY-G™ 30-240, POLY-G™ 76-120, POLY-G™ 85-34, LUMULSE™ POE 26, TEGOSTAB™ B 4690, TEGOSTAB™ B 8871, Diethylene Glycol, Diethanolamine, and DABCO™ 33LV were counted. It should be noted that LUMULSE™ POE 26 also functions as a cell opener, TEGOSTAB™ B 4690 and TEGOSTAB™ B8871 also function as surfactants, Diethylene Glycol and Diethanolamine also function as chain extenders, and DABCO™ 33LV also functions as a catalyst.

Particulate poly(2,6-dimethyl-1,4-phenylene ether) was obtained by jet milling commercial grade poly(phenylene ether) powder obtained as PPO™ 640 resin from Sabic Innovative Plastics. Compressed nitrogen gas was introduced into the nozzles of a jet mill to create a supersonic grinding stream. Particle-on-particle impact collisions in this grinding stream resulted in substantial particle size reductions. Large particles were held in the grinding area by centrifugal force while centripetal force drove finer particles toward the center of the discharge. A sieve of a specific upper size limit was then used in-line to recover particles with a precise size distribution and having diameters below the nominal sieve openings. Larger particles were recycled to the reduction size chamber for further grinding. The particulate poly(2,6-dimethyl-1,4-phenylene ether) was classified by passing the jet-milled particles through a screen with 6 micrometer openings. The particle size and shape characterization in Table 1 was determined using a CAM-SIZER™ XT from Retsch Technology GmbH operating in air dispersion mode.

All foams were prepared using a high-torque mixer (CRAFSTMAN 10-Inch Drill Press, Model No. 137.219000) at 3,100 rotations per minute (rpm) speed. All the components of the polyol system were premixed. The particulate PPE was treated as a filler and added to the polyol system. Then, the polyol system and isocyanate system were mixed for 7 or 10 second as noted in the Tables. The resulting mixture was then transferred into an open polyethylene container and allowed to free-rise. Foaming profiles, including cream time, gel time, and rise time were measured on all foams. After the rise time, the foams were immediately placed in an air-circulating oven for completion of cure (post-cure). Post-cure conditions (time and temperature) appear in the Tables.

All foams were aged under room conditions for minimum one week before testing as noted in the Examples. The following properties were measured according to ASTM D 3574-08:

Foam Density (Test A)
Resilience via Ball Rebound (Test H)
Tensile Strength at Break (Test E)
Elongation at Break (Test E)
Tear Strength (Test F)
CFD, Compression Force Deflection (Test C)
Hysteresis (Procedure B—CFD Hysteresis Loss)
Dry Constant Deflection Compression Set (Test D)
Wet Constant Deflection Compression Set (Test D & Wet Heat Aging, Test L)

The property labeled "Dry Compression @ 70° C. (% change in property)" in Table 2 was determined by measuring CFD at 50% deflection, dry aging in an air-circulating oven for 22 hours at 70° C. and a maximum of 6% relative humidity with the foam sample maintained at 50% deflection, measuring CFD at 50% deflection again, and calculating the percent change in CFD after dry aging.

The property labeled "Wet Compression @ 50° C. (% change in property)" in Table 2 was determined by measuring CFD at 50% deflection, exposing foam specimens in an environmental chamber for 22 hours at 50° C. and 95% relative humidity with the foam sample maintained at 50% deflection, measuring CFD at 50% deflection again, and calculating the percent change in CFD after the controlled environmental exposure.

The property labeled "Wet aged CFD @ 50% deflection (% change in property)" in Table 2 was determined by measuring CFD at 50% deflection, wet aging for 22 hours at 50° C. and 95% relative humidity with no load or stress on the sample, measuring CFD at 50% deflection again, and calculating the percent change in CFD after wet aging.

For each of "Dry Compression @ 70° C. (% change in property)", "Wet Compression @ 50° C. (% change in property)", and "Wet aged CFD @ 50% deflection (% change in property)", the percent change in the property is calculated according to the equation $$\text{percent change in property} = (P_0 - P_r) \times 100 / P_0$$

wherein $P_0$ is the property value for the unexposed specimen, and $P_r$ is the property value for the exposed specimen.

Flammability was measured as Horizontal Burning Rate according to ASTM D 5132-04.

The formulations in Comparative Example 1 and Examples 1, 2, 3, and 4 targeted high resilient flexible foams and were prepared with 0, 5.77, 10.91, 15.52, and 19.68 weight percent particulate PPE, respectively. The free-rise, water-blown foams were prepared with POLY-G™ 85-29 (an ethylene oxide capped polyether triol), LUMULSE™ POE 26 (ethoxylated glycerol) as a reactive cell opener, diethanolamine as a co-catalyst/cross-linker, MONDUR™ MRS-2 (a 2,4'-MDI rich isocyanate), and an Isocyanate Index of 90.

Formulations, reaction profiles, and properties are summarized in Table 2, where component amounts are expressed in units of parts by weight (pbw).

TABLE 2

|  | C. Ex. 1 | Ex. 1 | Ex. 2 | Ex. 3 | Ex. 4 |
| --- | --- | --- | --- | --- | --- |
| Particulate PPE (wt % based on total formulation) | 0 | 5.77 | 10.91 | 15.52 | 19.68 |
| Polyol system |  |  |  |  |  |
| POLY-G ™ 85-29 | 97 | 97 | 97 | 97 | 97 |
| Particulate PPE | 0 | 10 | 20 | 30 | 40 |
| LUMULSE ™ POE 26 | 3 | 3 | 3 | 3 | 3 |
| Water | 3.6 | 3.6 | 3.6 | 3.6 | 3.6 |
| Diethanolamine | 1 | 1 | 1 | 1 | 1 |
| TEGOSTAB ™ B 4690 | 1 | 1 | 1 | 1 | 1 |
| DABCO ™ 33LV | 0.8 | 0.8 | 0.8 | 0.8 | 0.8 |
| DABCO ™ BL-11 | 0.1 | 0.1 | 0.1 | 0.1 | 0.1 |
| Isocyanate System |  |  |  |  |  |
| MONDUR ™ MRS-2 | 56.75 | 56.75 | 56.75 | 56.75 | 56.75 |
| Isocyanate Index | 90 | 90 | 90 | 90 | 90 |
| Reaction Profile of Free-rise |  |  |  |  |  |
| Size of foam (g) | 200 | 200 | 200 | 200 | 200 |
| Mix time (sec) | 7 | 7 | 7 | 7 | 7 |
| Cream time (sec) | 16 | 14 | 12 | 10 | 9 |
| Gel time (sec) | 36 | 27 | 24 | 20 | 16 |
| Rise Time (sec) | 80 | 72 | 86 | 88 | 90 |
| Post-curing time (minutes) & temperature (° C.) | 30 min @ 80° | 30 min @ 80° | 30 min @ 80° | 30 min @ 80° | 30 min @ 80° |
| Properties |  |  |  |  |  |
| Free-rise density (g/cm³) | 0.03556 | 0.03764 | 0.04021 | 0.04293 | 0.04469 |
| Resilience (%) | 59.45 | 52.85 | 47.26 | 44.21 | 41.67 |
| CFD @ 25% (kPa) | 1.31 | 2.41 | 3.65 | 3.93 | 6.48 |
| CFD @ 50% (kPa) | 2.48 | 3.86 | 6.00 | 6.62 | 11.10 |
| CFD @ 65% (kPa) | 4.62 | 6.41 | 10.14 | 11.65 | 20.20 |
| Flammability-Burn rate (mm/min) | 13.12 | 11.84 | 11.77 | 11.28 | 9.84 |
| Tensile Strength (kPa) | 129 | 109 | 138 | 133 | 117 |
| Elongation at Break (%) | 140.4 | 102.9 | 81.6 | 71.3 | 47.5 |
| Tear Strength (N/m) | 543 | 560 | 578 | 665 | 578 |
| Hysteresis (%) | 50.7 | — | 56.4 | — | — |
| Dry Compression @ 70° C. (% change in property) | 5.6 | — | 5.9 | — | — |
| Wet Compression @ 50° C. (% change in property) | 9.9 | — | 11.7 | — | — |
| Wet aged CFD @ 50% deflection (% change in property) | 15.6 | — | 7.7 | — | — |

The addition of particulate PPE resulted in significant increases in Compression Force Deflection (CFD) measured at 25%, 50%, and 65% deflection, which indicated an improvement in load bearing properties of these foams. In addition, there was a significant increase in the retention of properties of CFD at 50% deflection after immersion in water. The CFD results suggest that the particulate PPE has potential to impart load bearing properties to the flexible foams.

Burn times decreased with increasing levels of particulate PPE. These results suggest flexible foam containing particulate PPE would be easier to flame retard than foams without particulate PPE.

The addition of particulate PPE was also associated with decreased cream times and gel times. Rise time behavior was more complex, with a decrease on going from 0 to 5.77% particulate PPE, and increases at other particulate PPE levels.

The formulations in Comparative Example 2 and Examples 5, 6, 7, and 8 targeted viscoelastic foams and were prepared with 0, 5.81, 10.99, 15.62, and 19.80 weight percent particulate PPE, respectively. The free-rise, water-blown foams were prepared with a mixture of three polyols, LUMULSE™ POE 26 (ethoxylated glycerol) as a reactive cell opener, diethylene glycol as a chain extender, MONDUR™ MRS-2 (a 2,4'-MDI rich isocyanate), and an Isocyanate Index of 80.

Formulations, reaction profiles, and properties are summarized in Table 3, where component amounts are expressed in units of parts by weight (pbw).

TABLE 3

|  | C. Ex. 2 | Ex. 5 | Ex. 6 | Ex. 7 | Ex. 8 |
|---|---|---|---|---|---|
| Particulate PPE (wt % based on total formulation) | 0 | 5.81 | 10.99 | 15.62 | 19.8 |
| Polyol system |  |  |  |  |  |
| POLY-G ™ 30-240 | 21 | 21 | 21 | 21 | 21 |
| POLY-G ™ 76-120 | 21 | 21 | 21 | 21 | 21 |
| POLY-G ™ 85-34 | 18 | 18 | 18 | 18 | 18 |
| Particulate PPE | 0 | 10 | 20 | 30 | 40 |
| LUMULSE ™ POE 26 | 40 | 40 | 40 | 40 | 40 |
| Water | 2.3 | 2.3 | 2.3 | 2.3 | 2.3 |
| Diethylene Glycol | 2.25 | 2.25 | 2.25 | 2.25 | 2.25 |
| TEGOSTAB ™ B 8871 | 1.5 | 1.5 | 1.5 | 1.5 | 1.5 |
| DABCO ™ 33LV | 0.1 | 0.1 | 0.1 | 0.1 | 0.1 |
| DABCO ™ BL-11 | 0.2 | 0.2 | 0.2 | 0.2 | 0.2 |
| Isocyanate System |  |  |  |  |  |
| MONDUR ™ MRS-2 | 55.71 | 55.71 | 55.71 | 55.71 | 55.71 |
| Isocyanate Index | 80 | 80 | 80 | 80 | 80 |
| Reaction Profile of Free-rise |  |  |  |  |  |
| Size of foam (g) | 300 | 300 | 300 | 300 | 300 |
| Mix time (sec) | 10 | 10 | 10 | 10 | 10 |
| Cream time (sec) | 26 | 18 | 17 | 16 | 15 |
| Gel time (sec) | 36 | 32 | 30 | 29 | 24 |
| Rise Time (sec) | 116 | 86 | 106 | 97 | 88 |
| Post-curing time (minutes) & temperature (° C.) | 60 min @ 70° C. | 60 min @ 70° C. | 60 min @ 70° C. | 60 min @ 70° C. | 60 min @ 70° C. |
| Properties |  |  |  |  |  |
| Free-rise density (g/cm$^3$) | 0.0372 | 0.0432 | 0.0476 | 0.0481 | 0.0503 |
| Resilience (%) | 0.91 | 0.86 | 1.47 | 1.63 | 2.24 |
| CFD @ 25% (kPa) | 0.41 | 0.69 | 1.10 | 0.90 | 1.31 |
| CFD @ 50% (kPa) | 0.69 | 1.03 | 1.72 | 1.45 | 2.28 |
| CFD @ 65% (kPa) | 1.17 | 1.65 | 2.96 | 2.69 | 4.27 |
| Flammability-Burn rate (mm/min) | 9.25 | 8.88 | 8.57 | 8.45 | 7.7 |
| Tensile Strength (kPa) | 79.3 | 64.1 | 57.9 | 46.9 | 29.0 |
| Elongation at Break (%) | 201.6 | 227.1 | 196.2 | 194.5 | 220.1 |
| Tear Strength (N/m) | 403 | 315 | 368 | 315 | 333 |
| Hysteresis (%) | 86.0 | — | 81.3 | — | — |
| Dry Compression @ 70° C. (% change in property) | 13.5 | — | 5.7 | — | — |
| Wet Compression @ 50° C. (% change in property) | 2.7 | — | 3.2 | — | — |
| Wet aged CFD @ 50% deflection (% change in property) | 30.0 | — | 5.6 | — | — |

The addition of particulate PPE resulted in viscoelastic foams with significant increases in Compression Force Deflection (CFD) measured at 25%, 50%, and 65% deflection which indicated an improvement in load bearing properties of these foams. In addition, there was a significant increase in the retention of properties of CFD at 50% deflection after immersion in water. The CFD results suggest that the particulate PPE has potential to impart load bearing properties to the flexible foams.

Burn times decreased with increasing levels of particulate PPE. These results suggest flexible foam containing particulate PPE would be easier to flame retard than foams without particulate PPE.

The addition of particulate PPE was also associated with decreased cream times, gel times, and rise times.

The invention claimed is:
1. A polyurethane foam comprising the product of a reaction mixture comprising:

40 to 70 weight percent of a polyol;
20 to 40 weight percent of an aromatic isocyanate compound having an average of at least 2 isocyanate groups per molecule;
2 to 30 weight percent of a particulate poly(phenylene ether) comprising repeating structural units having the formula

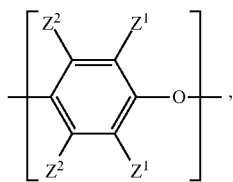

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms, and wherein the particulate poly(phenylene ether) has a mean particle size of 1 to 40 micrometers; and
0.5 to 5 weight percent of a blowing agent;
wherein the weight percent values are based on the total weight of the polyol, the aromatic isocyanate compound, the particulate poly(phenylene ether), and the blowing agent;
wherein the reaction mixture is characterized by an isocyanate index of 65 to 95; and
wherein the polyurethane foam has a density of 0.01 to 0.16 grams/centimeter$^3$.

2. The polyurethane foam of claim 1, wherein the polyol comprises a propylene oxide capped polyether triol, an ethylene oxide capped polyether polyol, or a combination thereof.

3. The polyurethane foam of claim 1, wherein the aromatic isocyanate compound comprises 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

4. The polyurethane foam of claim 1, wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof.

5. The polyurethane foam of any of claims 1-4, wherein the particulate poly(phenylene ether) is a particulate poly(2,6-dimethyl-1,4-phenylene ether).

6. The polyurethane foam of any of claims 1-4, wherein the particulate poly(phenylene ether) has a mean particle size of 2 to 8 micrometers.

7. The polyurethane foam of any of claims 1-4, wherein the blowing agent comprises water.

8. The polyurethane foam of claim 1,
wherein the polyol comprises an ethylene oxide capped polyether triol, a propylene oxide capped polyether triol, or a combination thereof;
wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof;
wherein the particulate poly(phenylene ether) is a particulate poly(2,6-dimethyl-1,4-phenylene ether);
wherein the particulate poly(phenylene ether) has a mean particle size of 2 to 8 micrometers;
wherein the blowing agent comprises water; and
wherein the reaction mixture comprises
45 to 65 weight percent of the polyol,
25 to 35 weight percent of the aromatic isocyanate compound,
3 to 25 weight percent of the particulate poly(phenylene ether), and
1.7 to 3 weight percent of the blowing agent.

9. An article comprising a polyurethane foam, the polyurethane foam comprising the product of a reaction mixture comprising:
40 to 70 weight percent of a polyol;
20 to 40 weight percent of an aromatic isocyanate compound having an average of at least 2 isocyanate groups per molecule;
2 to 30 weight percent of a particulate poly(phenylene ether) comprising repeating structural units having the formula

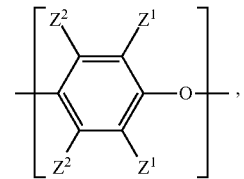

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and wherein the poly(phenylene ether) has a mean particle size of 1 to 40 micrometers; and
0.5 to 5 weight percent of a blowing agent;
wherein the weight percent values are based on the total weight of the polyol, the aromatic isocyanate compound, the particulate poly(phenylene ether), and the blowing agent;
wherein the reaction mixture is characterized by an isocyanate index of 65 to 95; and
wherein the polyurethane foam has a density of 0.01 to 0.16 grams/centimeter$^3$.

10. The article of claim 9, selected from the group consisting of bedding, furniture, automotive interiors, mass transportation interiors, flooring underlay, packaging, textiles, lining and gasketing applications, acoustic dampening materials, and weather stripping.

11. The article of claim 9,
wherein the polyol comprises an ethylene oxide capped polyether triol, a propylene oxide capped polyether triol, or a combination thereof;
wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof;
wherein the particulate poly(phenylene ether) is a particulate poly(2,6-dimethyl-1,4-phenylene ether);
wherein the particulate poly(phenylene ether) has a mean particle size of 2 to 8 micrometers;
wherein the blowing agent comprises water; and
wherein the reaction mixture comprises
45 to 65 weight percent of the polyol,
25 to 35 weight percent of the aromatic isocyanate compound,
3 to 25 weight percent of the particulate poly(phenylene ether), and
1.7 to 3 weight percent of the blowing agent.

12. A method of forming a polyurethane foam, the method comprising:
reacting
40 to 70 weight percent of a polyol, and
20 to 40 weight percent of an aromatic isocyanate compound having an
average of at least 2 isocyanate groups per molecule, in the presence of
2 to 30 weight percent of a particulate poly(phenylene ether) comprising repeating structural units having the formula

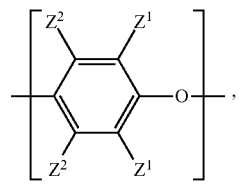

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms, and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms, and wherein the particulate poly(phenylene ether) has a mean particle size of 1 to 40 micrometers, and
0.5 to 5 weight percent of a blowing agent to form a polyurethane foam;
wherein the weight percent values are based on the total weight of the polyol, the aromatic isocyanate compound, the particulate poly(phenylene ether), and the blowing agent;
wherein the reaction mixture is characterized by an isocyanate index of 65 to 95; and
wherein the polyurethane foam has a density of 0.01 to 0.16 grams/centimeter$^3$.

13. The method of claim 12,
wherein the polyol comprises an ethylene oxide capped polyether triol, a propylene oxide capped polyether triol, or a combination thereof;
wherein the aromatic isocyanate compound comprises 2,4'-diphenylmethane diisocyanate, 4,4'-diphenylmethane diisocyanate, toluene 2,6-diisocyanate, toluene 2,4-diisocyanate, an oligomeric diphenylmethane diisocyanate having an average of greater than 2 and less than or equal to 4 isocyanate groups per molecule, or a combination thereof;
wherein the particulate poly(phenylene ether) is a particulate poly(2,6-dimethyl-1,4-phenylene ether);
wherein the particulate poly(phenylene ether) has a mean particle size of 2 to 8 micrometers;
wherein the blowing agent comprises water; and
wherein
the polyol amount is 45 to 65 weight percent,
the aromatic isocyanate compound amount is 25 to 35 weight percent,
the particulate poly(phenylene ether) amount is 3 to 25 weight percent, and
the blowing agent amount is 1.7 to 3 weight percent.

* * * * *